United States Patent
DeLuca et al.

(10) Patent No.: US 8,825,777 B2
(45) Date of Patent: Sep. 2, 2014

(54) SELECTIVE DELIVERY OF SOCIAL NETWORK MESSAGES WITHIN A SOCIAL NETWORK

(75) Inventors: Michael Joseph DeLuca, Boca Raton, FL (US); Thomas Casey Hill, Crystal Lake, IL (US)

(73) Assignee: BlackBerry Limited, Waterloo (CA)

( * ) Notice: Subject to any disclaimer, the term of this patent is extended or adjusted under 35 U.S.C. 154(b) by 378 days.

(21) Appl. No.: 13/253,252

(22) Filed: Oct. 5, 2011

(65) Prior Publication Data

US 2013/0091223 A1    Apr. 11, 2013

(51) Int. Cl.
*G06F 15/16*    (2006.01)

(52) U.S. Cl.
USPC .......................................... 709/206

(58) Field of Classification Search
None
See application file for complete search history.

(56) References Cited

U.S. PATENT DOCUMENTS

| | | | | |
|---|---|---|---|---|
| 6,732,185 | B1 * | 5/2004 | Reistad ........................ | 709/238 |
| 7,325,249 | B2 * | 1/2008 | Sutton et al. .................. | 726/13 |
| 8,306,922 | B1 * | 11/2012 | Kunal et al. .................. | 705/319 |
| 2002/0162025 | A1 * | 10/2002 | Sutton et al. .................. | 713/201 |
| 2004/0181462 | A1 * | 9/2004 | Bauer et al. .................. | 705/26 |
| 2006/0168006 | A1 | 7/2006 | Shannon et al. | |
| 2008/0177834 | A1 | 7/2008 | Gruhl et al. | |
| 2009/0290275 | A1 * | 11/2009 | Staszesky et al. ............. | 361/63 |
| 2010/0082751 | A1 | 4/2010 | Meijer et al. | |
| 2011/0055332 | A1 * | 3/2011 | Stein .............................. | 709/206 |
| 2011/0055335 | A1 * | 3/2011 | Reilly et al. .................. | 709/206 |

FOREIGN PATENT DOCUMENTS

WO    WO2011008886    1/2011

OTHER PUBLICATIONS

Extended European Search Report, EP Appl. 11184045.0, European Patent Office, Dec. 2, 2011.
www.surveilstar.com, "SurveilStar monitoring software—filter social networking sites", Oct. 1, 2008.

* cited by examiner

*Primary Examiner* — Brian P Whipple (57) ABSTRACT

The present disclosure provides for selective delivery of social network messages within a social network. When it is determined that one or more new messages to be communicated to members of a social group of the social network have content substantially similar to a given content of a plurality of messages previously communicated to the social group, notification of the one or more new messages to the one or more members of the social group can be selectively adjusted.

23 Claims, 4 Drawing Sheets

SELECTIVE DELIVERY OF SOCIAL NETWORK MESSAGES WITHIN A SOCIAL NETWORK

TECHNICAL FIELD

The present disclosure relates generally to the field of communications, and more particularly to communications in a social network.

BACKGROUND

Available content in social networks is moving quickly from network-generated content to user-generated content, particularly with the increased popularity and usage of social networking sites, such as Facebook, MySpace, Twitter, etc. that may employ microblogging, tweeting, texting, instant messaging (IM) to very quickly disseminate content. Social networks provide a valuable service in allowing users to generate content very quickly, and there are definite advantages in the so-called democratization of media. Users can generate content for free in order to garner the attention of a large number of social media users, and there is value in accessing the collective knowledge or intelligence of many users, as evidenced by sites such as Wikipedia.

The relative ease and speed with which content can be generated and communicated within social networks do present downsides, however. Hackers, or even normal users, can de-frame or bully other users in a social network environment very easily and quickly with messages whose content may include misinformation or untruthful, derogatory or defamatory statements that may even have elements of libel or slander. While in a normal free-speech arena, such misinformation or harmful messages may be corrected or counteracted by the dissemination of truth or corrective communications, in modern social networks the rate of transmission and re-transmission of detrimental messages can grow at such a fast rate as to render counter-point or corrective communications ineffective, resulting in potentially irrevocable damage to the target of the misinformation. Further, the unrestrained dissemination of messages in a social network can have adverse effects on network traffic. When sensational messages are posted and quickly re-posted to large numbers of members or users of a social network, a condition referred to as the "circular mill" phenomenon can arise. The term "circular mill" in the field of sociology refers to a situation in which ants that lose the pheromone track of other ants simply continue to follow one another, forming a continuously rotating circle or spiral and eventually dying from exhaustion. With the ability of social network users to easily and in real-time copy and re-transmit popular messages from one user to a multitude of other users, as is the case of re-tweeting on Twitter, for example, the potential reach of such re-postings within the social group or network can be exponential, presenting a significant hazard to bandwidth and other traffic resources of the network.

It can be understood that as social networks and social networking sites have become very "real-time" in their ability to deliver messages, especially when accessed through the use of mobile devices such as smart phones, for example, there is a danger that network traffic resources will be drained, and that real people or entities will be harmed by the over-usage of social networks in a negative way, as evidenced by recent occurrences of defamatory comments on micro-blogging social networking sites. If unchecked, such social networking behaviour has the potential to have serious detrimental effects on traffic or on users of social networking sites.

BRIEF DESCRIPTION OF THE DRAWINGS

Example embodiments of the present disclosure will be described below with reference to the included drawings such that like reference numerals refer to like elements and in which.

DETAILED DESCRIPTION

In order to counter the occurrence of on-line bullying or circular mill situations that may be detrimental to users as well as to traffic congestion of a social network, there is provided a way to manage without controlling or censoring social communications in those situations where social network users by virtue of the powerful attributes of the mobile devices used to access a social network have instant access coupled with the ability to utilize large amounts of bandwidth in the social network. The various examples described herein provide a way to regulate electronic communications within a social group of a social network by determining if one or more new messages to be communicated to the social group has content that is substantially similar to a multiplicity of messages recently intended for communication to the social group, and then delaying notification of the one or more new messages to a member of the social group if the content is found to be objectionable. Also provided herein is a way to observe messages, discover detrimental patterns to users or to network traffic, and make adjustments to the speed of such messages so that the detrimental patterns may be mitigated. Such adjustments may even cause the detrimental patterns to become positive patterns.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Therefore, in accordance with an aspect of the present disclosure, there is provided a method of managing electronic communications within a social group of a social network, comprising: determining whether one or more new messages to be communicated to one or more members of the social group comprises content substantially similar to a given content of a plurality of messages communicated within the social group; and selectively adjusting notification of the one or more new messages to the one or more members of the social group in response to determining that one or more new messages to be communicated to one or more members of the social group comprises content substantially similar to the given content In accordance with another aspect of the present disclosure, there is provided a method of managing electronic communications of a social network, comprising: observing a plurality of messages communicated within a social group of a social network, the plurality of messages sharing a given content; determining one or more detrimental patterns of the observed plurality of messages communicated, wherein the one or detrimental patterns are potentially socially harmful to at least one of one or more users of the social network and to message traffic in the social network; and selectively adjusting notification of one or more new messages having content substantially similar to the given content of the plurality of messages communicated within the social group in order to mitigate the one or more detrimental patterns.

In accordance with a further aspect of the present disclosure, there is provided a social network server coupled to a communications network that facilitates exchange of electronic communications within a social group of the communications network, the social network server comprising: a processor; and a memory coupled to and in cooperative arrangement with the processor, the processor and the memory configured to: determine whether one or more new messages to be communicated to a plurality of members of the social group comprises content substantially similar to a given content of a plurality of messages communicated within the social group, the plurality of messages stored in the memory of the social network server; and selectively adjust notification of the one or more new messages to the one or more members of the social group in response to determining that one or more new messages to be communicated to one or more members of the social group comprises content substantially similar to the given content.

In accordance with other aspects of the present disclosure, there is provided a social network server coupled to a communications network that facilitates the exchange of electronic communications within a social group of the communications network, the social network server comprising: a processor; and a memory coupled to and in cooperative arrangement with the processor, the processor and the memory configured to: observe a plurality of messages communicated within a social group of a social network, the plurality of messages sharing a given content; determine one or more detrimental patterns of the observed plurality of messages communicated, wherein the one or detrimental patterns are potentially socially harmful to at least one of one or more users of the social network and message traffic in the social network and wherein the one or more detrimental patterns are determined from the plurality of messages stored in the memory of the social network server; and selectively adjust notification to the social group of one or more new messages having content substantially similar to the given content of the plurality of messages in order to mitigate the one or more detrimental patterns.

In accordance with still further aspects of the present disclosure, there is provided a non-transitory computer-readable medium having computer-executable instructions for causing a server comprising a processor and associated memory to manage electronic communications within a social group of a social network comprising: determining whether one or more new messages to be communicated to one or more members of the social group comprises content substantially similar to a given content of a plurality of messages communicated within the social group; and selectively adjusting notification of the one or more new messages to the one or more members of the social group in response to determining that the one or more new messages to be communicated to the one or members of the social group comprises content substantially similar to the given content.

Figure 1:
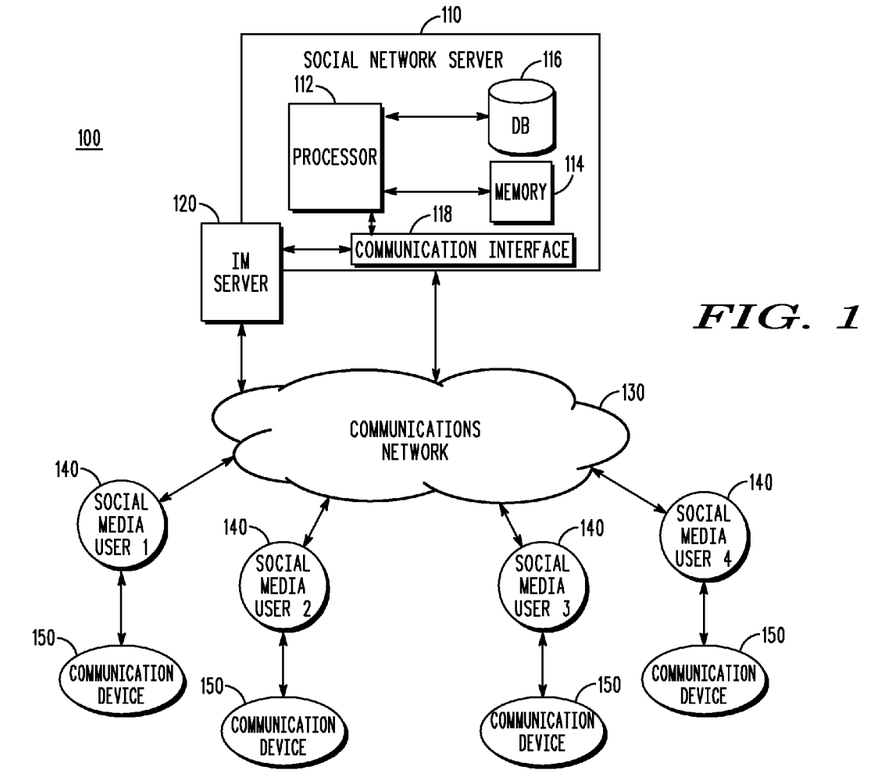
FIG. 1 is a block diagram of a communications system that includes a social network server, a communications network, and various social media users of a social network, in accordance with various aspects of the present disclosure.

Referring now to FIG. 1, a block diagram of a communications system 100 that includes a social network server 110, a communications network 130, and various social media users 140 of a social network, is illustrated, in accordance with various examples of the present disclosure. The communications system 100 can be for a social network which may or may not have instant messaging (IM) capabilities, as shown. Members of a social group are illustrated as social media users 1, 2, 3, 4, etc. that are able to communicate on the social network via communication devices 150.

Social network server 110 may include a processor 112, a memory 114, and associated database 116. The social network server 110 is able to communicate with the communications network via communication interface 118, as shown. As mentioned, the social network server may or may not have instant messaging (IM) capabilities, which may be provided by IM server 120. Database 116 can store data relating to various applications, including third party applications, data related to users 140 and friends, data for stored programs and generally data of use in the social network. Processor 112 is operative with database 116, memory 114, and communication interface 118 to effectively manage or regulate communications within a social group of a social network as will be described. Data including electronic communications or messages within the social network can be transmitted to and from various members 140 of the social network through communication interface 118 of the social network server and through communications network 130. Communications network 130 can be a wireless communications network and the various social media users 140 could use portable mobile devices, such as wireless communication devices. If utilized, IM server 120 may support various forms of messaging services, such as Short Message Service (SMS), Blackberry Messenger (BBM), etc.

Social network server 110 may be comprised of a number of different servers, with each server having one or more processors 112, databases 116, memories 114, and respective communication interface 118. Multiple IM servers 120 may also be used. The social network server 110 may be by way of example, and not limitations, a Network Operations Center (NOC), such as a Blackberry Enterprise Server (BES), or other central server arrangement that can combine many social networks and manage them collectively. Load balancing between various social network servers 110 may be employed in such configurations.

Communication device 150 is a two-way electronic communication device having at least data and possibly also voice communication capabilities, and the capability to communicate with other communication devices or computer systems, for example, via the Internet. A communication device 150 may further be a mobile or handheld electronic device and may be wireless. Depending on the functionality provided by the electronic communication device, in the various examples described herein, the device may be a data communication device, a multiple-mode communication device configured for both data and voice communication, a smartphone, a mobile telephone or a personal digital assistant PDA (personal digital assistant) enabled for wireless communication, or a computer system with a wireless modem. Other examples of mobile electronic devices include mobile, or handheld, wireless communication devices such as pagers, cellular phones, cellular smart-phones, wireless organizers, wirelessly enabled notebook computers, tablet computing devices, and so forth. The mobile electronic device may also be a portable electronic device without wireless communication capabilities, such as a handheld electronic game device, digital photograph album, digital camera, or other device.

In accordance with various examples, social network server 110 is coupled to communications network 130 to facilitate the exchange of electronic communications within a social group of the communications network. Social network 110 can monitor the distribution size and content of a social network for a given topic or user(s). Since the speed and size of certain new communications may be considered detrimental, a throttle to slow down the time to communicate new messages to members of a social group provides time for moderators to intervene, provide monitor alerts, and to generally mitigate problems related to network traffic or bad content or both. In this way, immediate communication can be slowed when distribution of messages related to a given content reaches a certain volume or size (indicative of the circular mill phenomenon) or when the content itself is objectionable. Traffic related to the given content can be accordingly selectively delayed for new messages having the identified content of concern. Further, while the rate of growth of undesirable communications for either a circular mill condition or cyber-bullying can be controlled and slowed, counter-balancing, positive communications may be prioritized. For example, in the event of a circular mill condition in a social network, the rapid growth of broadcast of communications that substantially parrots the content of other communications within the social group will be slowed while broadcast communications with content that leads in a different direction (i.e. substantially different content) can be prioritized using known linguistic analysis tools.

As shown in FIG. 1, the processor and the memory are coupled together and in cooperative arrangement to determine whether one or more new messages to be communicated to members 140 of the social group has content substantially similar to a given content of a plurality of messages communicated to the social group, stored in memory 114 of the social network server. The processor working together with the memory can monitor messages communicated within the social group and determine messages sharing given content that has been communicated to the social group. This sharing may occur, for example, where at least a growth rate of distribution of the messages sharing the given content meets or exceeds a growth rate threshold, or where a quantity of the plurality of messages sharing the given content meets or exceeds a message quantity threshold. Before the social network server 110 forwards new social network messages to the social network, the social network server 110 monitors new social network messages and processes the contents thereof. As will be appreciated by those skilled in the art, the social network server 110 may include natural language parsing capabilities to convert the text of new social network messages into a quantifiable format.

If it is determined that the content of the one or more new messages to be communicated has content substantially similar to the content of the stored messages, notification of the one or more new messages to one or more members of the social group can be selectively delayed by processor 112. This selective delaying is of use where defamatory content or misinformation contained in previously communicated messages has been identified. Selectively delaying notification of the one or more new messages with the same undesirable content provides the benefit of slowing the spread of cyber-bullying messages within a social group, for example. The given content of the previously communicated messages may be content related to an objectionable topic or content related to a member of the social group.

Additionally, even if the content is not itself considered objectionable, there are traffic load considerations in social networks. Identification of content of the one or more new messages as having content substantially similar to content associated with a very large number of previously communicated messages in the social group may indicate the occurrence of a circular mill phenomenon that can be mitigated by selectively delaying notification of one or more new messages having the substantially same content.

Selectively delaying notification of the new messages may be of interest when social network server 110 determines that a growth rate of distribution of the plurality of messages sharing the given content within the social group meets or exceeds a growth rate threshold, or that a quantity of the plurality of messages sharing the given content meets or exceeds a message quantity threshold, or both.

Conversely, if the content of the new message(s) is determined to not be substantially similar to the content of previously communicated messages, communication of the new message(s) can be selectively prioritized by processor 112. In this way, new messages having "good content", i.e. not objectionable content or not content that proliferates an undesirable circular mill phenomenon in the social network, may be favored over new messages having "bad content." Or, if the content of the new message(s) is not substantially similar to the given content of the plurality of messages that have been communicated to the social group but comprises flagged content, notification of the one or more new messages to the one or more members of the social group may still be selectively delayed.

The social network server 110 can determine the existence of a sufficient amount of flagged content as to indicate a message of objectionable content. In particular, the flagged words may be stored in database 116 in the memory 114 of the social network server, and may include profane, obscene, and defamatory words. If the new social network message contains a number of flagged words that exceeds a threshold, the social network server 110 can selectively slow down notification of the new social network message. Advantageously, selectively slowing down notification of objectionable new messages containing flagged content permits moderators of the social network, such as a moderator entity, to more readily remove or mitigate objectionable content before it is viewed by many users.

Selectively delaying notification of the one or more new messages may be accomplished by processor 112 and memory 114 of social network server 110 being configured to delay reception of the one or more new messages by one or more members of the social group. For example, the processor may delay completion of transmission of the one or more new messages to delay its reception. This transmission completion delay may be accomplished by the processor controlling transmission of the one or more new messages at a reduced data rate, postponing at least a portion of the transmission of the one or more new messages, or buffering the one or more new messages for a certain time. The insertion of dummy packets into the one or more new messages may be effective to postpone at least a portion of transmission of the one or more new messages.

It is noted that the processor 112 and memory 114 of the social network server 110 is further operable to alert a moderator entity of the given content of the identified messages. This alerting can take the form of generating alert messages for informing network administrators or moderators of the social network of the observed content trend. In response to the alert, the moderator entity can control the social network server to selectively delay notification of the one or more new messages to the one or more members of the social group when the one or more new messages are characterized as having content that is substantially similar to the given content of the identified plurality of messages. The moderator entity may be a person or program in communication with the social network server, and may or may not reside or be located at the social network server. For example, the moderator entity could be a technician tasked with receiving and responding to alerts concerning traffic in the social network. Likewise, this task could be performed by a software application.

The social network server 110 may be configured to observe messages, such as IMs, in a social network, discover any detrimental patterns to users of social network traffic, and make adjustments to the speed at which notification of such messages occurs, such that detrimental patterns cease or at least are mitigated. The social network server may even be able to disrupt detrimental patterns to become positive ones. The processor 112 and memory 114 in cooperative arrangement can observe messages communicated within a social group of a social network that share a given content, as discussed above. One or more detrimental patterns of the observed messages can be determined. The one or more detrimental patterns may be potentially socially harmful to at least one of the users of the social network or to message traffic in the social network, and may be determined from the plurality of messages stored in the memory of the social network server. Thus a detrimental pattern may be messages of a cyber-bullying, derogatory, or negative nature about a member of the social group. Or, a detrimental pattern would be established by the rapid growth of communication messages associated with a given content, an indication of a circular mill situation in which network traffic is adversely affected.

Quantitatively, then, one or more detrimental patterns of messages communicated may be a growth rate of distribution of the plurality of messages sharing the given content that meets or exceeds a growth rate threshold, a quantity of the plurality of messages that meets or exceeds a message quantity threshold, the given content comprising flagged content, and the given content comprising an originality level less than an originality threshold.

Processor 112 may accordingly selectively adjust notification to the social group of one or more new messages having content substantially similar to the given content of the plurality of messages in order to mitigate the one or more detrimental patterns. This selective notification adjustment would have the effect, for example, of slowing down the growth of communications having substantially similar content in a circular mill, or disrupt the flow of offensive or objectionable messages. Introducing new, positive messages within the social group may in fact be potentially beneficial to one or more users of the social network, replacing misinformation with truthful or positive information, to yield a beneficial pattern that counters the detrimental pattern. Likewise, the disruption of detrimental patterns can improve message traffic in the social network, especially if the negative effect of a circular mill on traffic patterns is lessened.

As previously mentioned, the processor 112 and memory 114 may selectively delay notification of the one or more new messages to one or more members of the social group to selectively adjust notification of the one or more new messages. This selective delay notification may include a delay of reception of the new message(s) by members of the social group in which completion of transmission of the new messages is delayed, such as by the processor causing the new messages to be transmitted at a reduced data rate or to postpone at least a portion of the transmission. Dummy packets may be inserted into the new message(s) as previously mentioned. The one or more new messages may otherwise be buffered for a certain time.

It can be seen, therefore, that while the communication devices 150 can participate fully in the social network, the social network server 110 monitors the distribution and delivery of new messages as they pass through, effectively throttling or slowing down the throughput of new messages determined to be detrimental to network traffic or to social network users or both, while at the same time prioritizing those new messages considered to be beneficial. If the pattern of content of new messages passing through social network server 110 indicates the presence of a circular mill, social network server 110 can help disrupt this condition, thus alleviating strain on valuable network resources in the social network.

Figure 2:
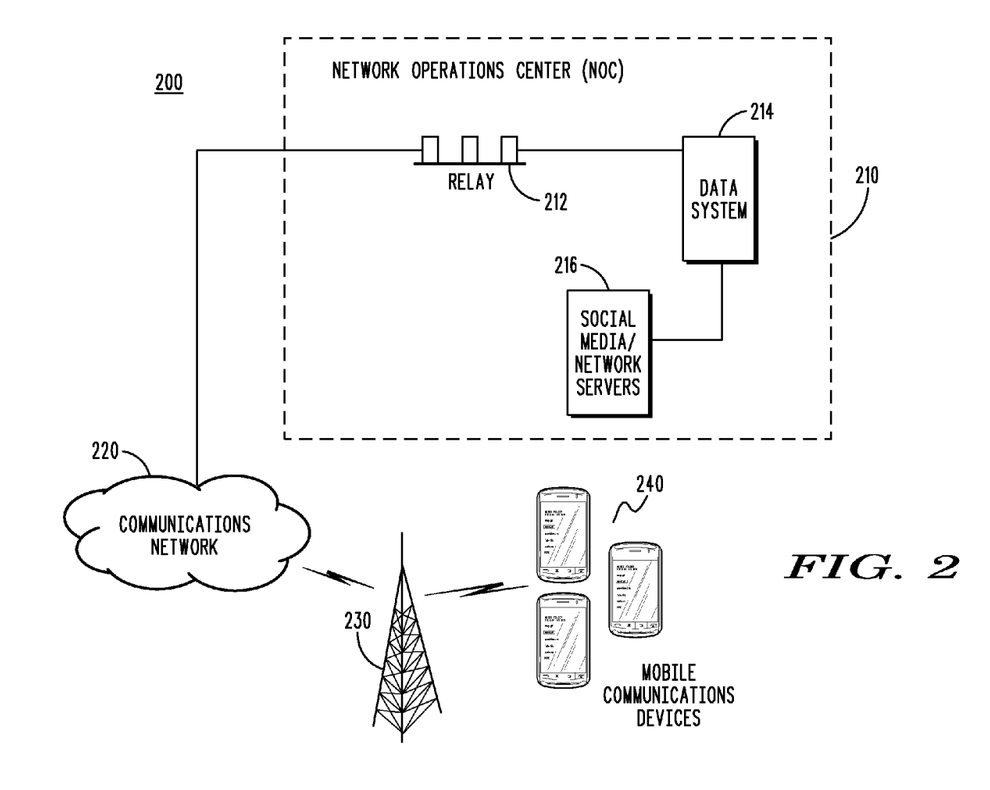
FIG. 2 is an illustration of a communications system that employs a network operations center (NOC), in accordance with various aspects of the present disclosure.

The social network server may be implemented as a NOC, such as BES, or other central server configuration capable to combine many social networks and manage them collectively. NOC may refer to one or more servers or locations from which control of a communications network, including a social media network, is exercised. NOCs commonly are responsible for monitoring communications networks and user activity in a social network for alarms or other conditions that require attention. The moderator entity referenced below may be a NOC technician, such as a site technician or a network engineer, for example. Referring now to FIG. 2, a block diagram of a communications system 200 that employs a Network Operations Center 210 to monitor user activity in a social network is described. NOC 210 communicates with a communications network 220, such as a mobile carrier network, and one or more communication devices, such as mobile or wireless communication devices 240, can communicate wirelessly with carrier network 220 via one or more base station towers. In this example, the wireless communication devices 240 can be wireless handheld devices.

NOC 210 has a relay 212, a data system 214, like a public MDS such as the Blackberry Mobile Data System (MDS), and one or more social network/media servers 216 to which the data system is coupled. The NOC can monitor the distribution size of a social network for a given topic or user(s) and under control of the processor(s) of the social network servers 216 slow down the communication time for new messages to give moderator entities an opportunity to intervene, provide monitor alerts, etc. As previously described, the NOC 210 can attenuate the speed of communications in various ways, such as reducing bit rate, placing packet gaps in messages, etc. to slow down the immediate growth of communications having substantially similar content or being otherwise objectionable.

Figure 3:
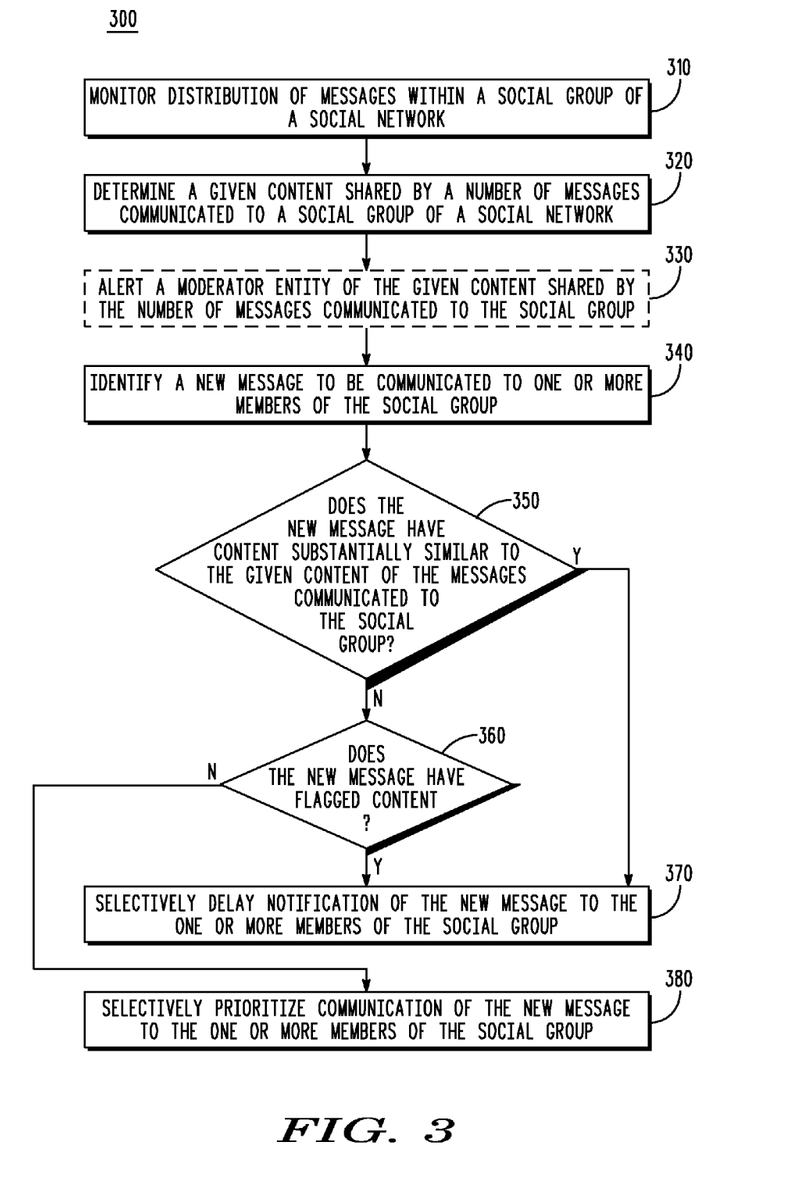
FIGS. 3 and 4 illustrate flows illustrative of various methodologies, in accordance with various aspects of the present disclosure.

In the flowchart 300 of FIG. 3, a methodology for selectively delaying notification of new messages in a social group of a social network, in accordance with certain examples, is disclosed. The method provides a way of regulating electronic communications within the social group by determining if one or more new messages to be communicated to the social group have content substantially similar to a multiplicity of messages recently intended for communication to the social group. Communication of the new message(s) can be delayed in accordance with the determination.

At Block 310, distribution of messages within a social group of a social network is monitored. This may entail monitoring distribution of messages within the social group of the social network, and determining those messages sharing the given content that have been communicated to the social group and for which future messages related to the given content are to be managed. As previously discussed, this may be accomplished by a social network server.

The social network server monitors new social network messages and processes the contents thereof. As will be appreciated by those skilled in the art, the social network server may include natural language parsing capabilities to convert the text of the new social network messages into a quantifiable format. The social network server can perform several content checks on each new social network message to determine a quality of content. In particular, the social network server can determine different topics for new social network messages. The social network server can store the topics of new social network messages and performs an analysis thereof to determine topic trends, for example. The social network server can determine if a quantity or a growth rate of social network messages for a given topic or content exceeds a first threshold, and if so, selectively slow down notification of new social network messages for the given content based upon a threshold being exceeded. In this way, the social network server can monitor the real-time distribution of topics in new social network messages to reduce the effect of a disproportionate amount of new social network messages for the given topic. Given the instantaneous nature of communications in the social network, the social network server is able to monitor traffic quantity and growth in real-time.

At Block 320, a given content shared by a number of messages communicated to the social group is determined. Again, the given content may be inherently objectionable content or it may be content shared by a number of messages that impact network traffic in some way, such as by virtue of the growth rate of distribution of messages with the given content meeting or exceeding a growth rate threshold, the quantity of messages sharing the given content meets or exceeds a message quantity threshold, the given content having flagged content, or having an originality level less than an originality threshold. When a number of messages share a given content and have an impermissibly high growth rate of distribution, or where the quantity of messages sharing the given content meets or exceeds a message quantity threshold, the existence of a circular mill situation in the social network may be indicated. Flagged content is verboten in the network. A number of messages sharing a given content whose originality level is less than a threshold indicates again the existence of a circular mill in the social network with no new information or value being provided but at a premium use of bandwidth of the network traffic.

The social network server can determine an originality level for a new social network message. The originality level may be determined using linguistic comparison between the recently exchanged social network messages. If the social network server determines a respective new social network message as having a high originality level, the social network server can selectively speed up delivery of the respective new social network message. Conversely, if the social network server determines the new social network message possesses a low originality level, the server may slow down delivery of the message. The given content may be related to an objectionable or offensive topic or content related to a member of the social group.

At Block 330, a moderator entity may be alerted or informed of the determination of a group of messages in the social network group sharing the given content; the dashed lines of the box indicate that this is an optional action. Moreover, such an alert may take place later in the process of FIG. 3 if desired. In alerting a moderator entity of the given content shared by the group of messages, the messages may be characterized as having one or more of a growth rate of distribution of the plurality of messages sharing the given content that meets or exceeds a growth rate threshold and a quantity of the plurality of messages that meets or exceeds a message quantity threshold. The moderator entity can selectively delay notification of the one or more new messages to members of the social group when the one or more new messages are characterized as having content that is substantially similar to the given content of the plurality of messages, thereby reducing the growth rate. As previously mentioned, the moderator entity can selectively delay notification of one or more new messages to the social group even when the content of the one or more new messages is not substantially similar to the given content of the plurality of messages but comprises flagged content.

At Block 340, one or more new messages to be communicated within the social group are identified. At Decision Block 350, the inquiry is whether the new message(s) have content substantially similar to the given content of the messages identified in Block 320. If the content of the new message(s) is substantially similar to the given content of the messages previously communicated in the social group, then at Block 370 notification of the new message(s) to the intended recipients of the social group may be delayed in the one or more of the ways of selective delay notification discussed at length above. If the content is not substantially similar, the flow continues to Decision Block 360.

If result of the inquiry at Block 350 is no, the inquiry at Decision Block 360 is whether the new message(s) has flagged content. If no, then notification of the new message(s) need not be delayed and in fact communication can be selectively prioritized to one or more members of the social group if desired at Block 380. If, however, the new message(s) have flagged content, notification of the new message(s) may be delayed to the intended recipients of the social group at Block 370 in the one or more of the ways of selective delay notification discussed at length above. Thus, even if a new message does not have substantially similar content to the given content determined at Block 320, its notification may be delayed due to the existence of flagged content.

As described, selectively delaying notification of the one or more new messages to members of the social group may comprise delaying a reception of the one or more new messages by the group members. Reception can be delayed by delaying a completion of transmission of a new message, such as by transmitting at a reduced data rate, postponing at least a portion of the transmission of the new message, or buffering the new message for a certain time; dummy packets may be inserted into the new message(s). Moreover, delaying notification of the new message(s) to the social group may include an alert of the new message(s) after its reception, such as by a social network server.

With regard to the selective prioritization of the new message(s) at Block 380, if the content of the new message(s) is characterized as having an originality level with regard to the given content of the previously sent messages that meets or exceeds an originality threshold, then such new message(s) are good candidates for prioritization over other messages. Their originality indicates that the do not have objectionable content that is part of a detrimental pattern.

Figure 4:
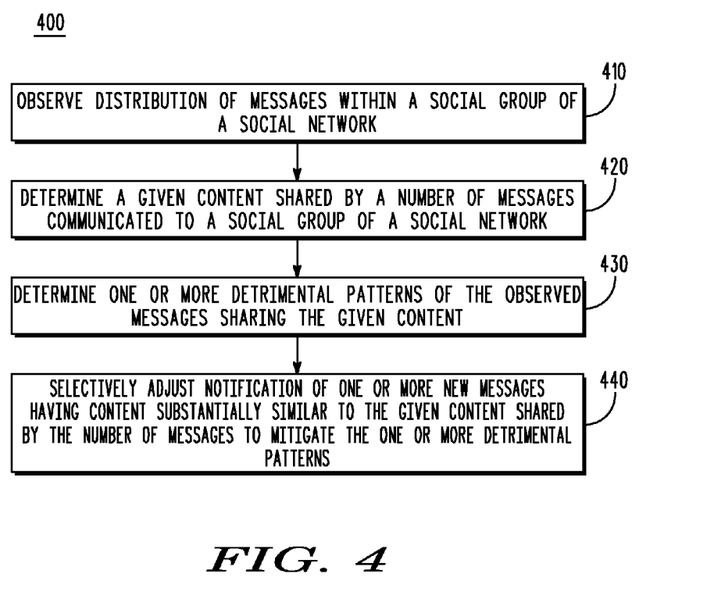

In accordance with certain other examples, the existence of detrimental patterns to users or social network traffic can be determined and adjustments to new message notification or other corrective action taken. Referring now to FIG. 4, flow 400 details a methodology for the discernment of detrimental patterns and corrective action that may be taken in response to those detrimental patterns. At Block 410, the distribution of messages within a social group of a social network is observed. From that observation, a given content shared by previously communicated messages to the social group can be determined, at Block 420. One or more detrimental patterns of the observed messages that share the given content can be determined, at Block 430. The detrimental patterns can be potentially socially harmful to either or both of a user of the social network or to message traffic in the social network. At Block 440, in response to the discovery of the detrimental patterns, notification of one or more new messages having content substantially similar to the given content shared by the previously communicated messages can be selectively adjusted in order to mitigate the one or more detrimental patterns.

Selective adjustment of notification of new message(s) having substantially similar content may yield one or more beneficial patterns that are potentially beneficial to either or both of users of the social network and to message traffic in the social network. Selective adjustment of new message notification has been previously discussed before, and can include by way of example, and not limitation, delaying notification by delaying reception of new messages by the social group members, such as by delaying completion of transmission of the new messages. This selective adjustment may be accomplished by transmitting at a reduced data rate or postponing at least a portion of the transmission of the one or more new messages. Selectively delaying notification of the new message(s) may also comprise an alert of the new message(s) after their reception, such as an alert by a social network server after the new message(s) are received by the social network server.

While the blocks comprising the methods are shown as occurring in a particular order, it will be appreciated by those skilled in the art that many of the blocks are interchangeable and can occur in different orders than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of managing electronic communications within a social group of a social network, comprising:
    monitoring messages communicated within the social group;
    determining content shared by a number of messages communicated within the social group, wherein the number of messages sharing the determined content satisfies at least one of:
        a growth rate of the number of messages meets or exceeds a growth rate threshold; and
        the number of messages meets or exceeds a message quantity threshold;
    determining whether one or more new messages to be communicated to one or more members of the social group comprises content similar to the determined content; and
    selectively adjusting notification of the one or more new messages to the one or more members of the social group in response to determining that the one or more new messages to be communicated to the one or more members of the social group comprises content similar to the determined content.

2. The method of claim 1, further comprising:
    selectively prioritizing communication of the one or more new messages to the one or more members of the social group if the content of the one or more new messages is not similar to the determined content.

3. The method of claim 2, wherein the content of the one or more new messages has an originality level with regard to the determined content.

4. The method of claim 1, further comprising selectively adjusting notification of the one or more new messages to the one or more members of the social group when the content of the one or more new messages is not similar to the determined content, but comprises flagged content.

5. The method of claim 1, wherein selectively adjusting notification of the one or more new messages to the one or more members of the social group comprises selectively delaying a reception of the one or more new messages by the one or more members by selectively delaying a completion of transmission of the one or more new messages.

6. The method of claim 1, wherein selectively adjusting notification of the one or more new messages to the one or more members of the social group comprises transmitting an alert of the one or more new messages after reception of the one or more new messages by a social network server.

7. The method of claim 1, further comprising:
    alerting a moderator entity of the determined content;
    the moderator entity selectively delaying notification of the one or more new messages to the one or more members of the social group when the one or more new messages has content that is similar to the determined content.

8. The method of claim 7, further comprising the moderator entity selectively delaying notification of the one or more new messages to the one or more members of the social group when the content of the one or more new messages is not similar to the determined content but comprises flagged content.

9. The method of claim 1, further comprising:
observing the plurality of messages communicated within the social group of the social network, the plurality of messages sharing the determined content;
determining one or more detrimental patterns of the observed plurality of messages communicated, wherein the one or detrimental patterns are potentially socially harmful to at least one of one or more users of the social network and to message traffic in the social network; and
selectively adjusting notification of one or more new messages having content similar to the determined content of the plurality of messages communicated within the social group in order to mitigate the one or more detrimental patterns.

10. A social network server coupled to a communications network that facilitates exchange of electronic communications within a social group of the communications network, comprising:
a processor; and
a memory coupled to and in cooperative arrangement with the processor, the processor and the memory configured to:
monitor messages communicated within the social group;
determine content shared by a number of messages communicated within the social group, wherein the number of messages sharing the determined content satisfies at least one of:
a growth rate of the number of messages meets or exceeds a growth rate threshold; and
the number of messages meets or exceeds a message quantity threshold;
determine whether one or more new messages to be communicated to a plurality of members of the social group comprises content similar to the determined content, the plurality of messages stored in the memory of the social network server; and
selectively adjust notification of the one or more new messages to the one or more members of the social group in response to determining that one or more new messages to be communicated to one or more members of the social group comprises content similar to the determined content.

11. The server of claim 10, wherein the determined content of the plurality of messages is at least one of content related to an objectionable topic and content related to a member of the social group.

12. The server of claim 10, wherein the processor and the memory in cooperative arrangement selectively adjust notification of the one or more new messages to one or more members of the social group by selectively delaying notification of the one or more new messages.

13. The server of claim 10, the processor and the memory of the social network server further configured to:
selectively prioritize communication of the one or more new messages to the one or more members of the social group if the content of the one or more new messages is not similar to the determined content.

14. The server of claim 10, the processor and the memory of the social network server further configured to:
selectively adjust notification of the one or more new messages to the one or more members of the social group when the content of the one or more new messages is not similar to the determined content, but comprises flagged content.

15. The social network server of claim 10, the processor and the memory further configured to:
observe a plurality of messages communicated within the social group of the social network, the plurality of messages sharing the determined content;
determine one or more detrimental patterns of the observed plurality of messages communicated, wherein the one or detrimental patterns are potentially socially harmful to at least one of one or more users of the social network and message traffic in the social network and wherein the one or more detrimental patterns are determined from the plurality of messages stored in the memory of the social network server; and
selectively adjust notification to the social group of one or more new messages having content similar to the determined content in order to mitigate the one or more detrimental patterns.

16. The server of claim 15, the processor and the memory further configured to:
selectively adjust notification of the one or more new messages to yield one or more beneficial patterns that are potentially beneficial to at least one of one or more users of the social network and to message traffic in the social network.

17. The server of claim 15, wherein the one or more detrimental patterns of the plurality of messages communicated comprise one or more of a growth rate of distribution of the plurality of messages sharing the determined content that meets or exceeds a growth rate threshold, the quantity of the plurality of messages that meets or exceeds the message quantity threshold, the determined content comprising flagged content, and the determined content comprising an originality level less than an originality threshold.

18. The server of claim 15, wherein the processor and memory generate an alert of the one or more new messages after reception of the one or more new messages by the social network server to selectively adjust notification of the one or more new messages to the one or more members of the social group.

19. A non-transitory computer-readable medium having computer-executable instructions for causing a server comprising a processor and associated memory to manage electronic communications within a social group of a social network by a performing a method comprising:
monitoring messages communicated within the social group;
determining content shared by a number of messages communicated within the social group, wherein the number of messages sharing the determined content satisfies at least one of:
a growth rate of the number of messages meets or exceeds a growth rate threshold; and
the number of messages meets or exceeds a message quantity threshold;
determining whether one or more new messages to be communicated to one or more members of the social group comprises content similar to the determined content; and
selectively adjusting notification of the one or more new messages to the one or more members of the social group in response to determining that the one or more new messages to be communicated to the one or members of the social group comprises content similar to the determined content.

20. The non-transitory computer-readable medium of claim 19, further comprising:
selectively prioritizing communication of the one or more new messages to the one or more members of the social group if the content of the one or more new messages is not similar to the determined content of the plurality of messages.

21. The non-transitory computer-readable medium of claim 19, further comprising selectively delaying notification of the one or more new messages to the one or more members of the social group when the content of the one or more new messages is not similar to the determined content but comprises flagged content.

22. The non-transitory computer-readable medium of claim 19, wherein selectively adjusting notification of the one or more new messages to the one or more members of the social group comprises one or more of delaying a reception of the one or more new messages by the one or more members and transmitting an alert of the one or more new messages after its reception by the server.

23. The non-transitory computer-readable medium of claim 19, further comprising:
observing a plurality of messages communicated within the social group sharing the determined content;
determining one or more detrimental patterns of the observed plurality of messages communicated, wherein the one or detrimental patterns are potentially socially harmful to at least one of one or more users of the social network or message traffic in the social network; and
selectively adjusting notification of the one or more new messages having content similar to the determined content of the plurality of messages within the social group in order to mitigate the one or more detrimental patterns.

* * * * *